US008102918B2

(12) United States Patent
Cham

(10) Patent No.: US 8,102,918 B2
(45) Date of Patent: Jan. 24, 2012

(54) GENERATION OF AN ORDER-2N TRANSFORM FROM AN ORDER-N TRANSFORM

(75) Inventor: Wai Kuen Cham, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 938 days.

(21) Appl. No.: 12/103,678

(22) Filed: Apr. 15, 2008

(65) Prior Publication Data

US 2009/0257505 A1 Oct. 15, 2009

(51) Int. Cl.
*H04N 7/12* (2006.01)

(52) U.S. Cl. ......... 375/240.18; 375/240.16; 375/240.17; 382/248; 382/232

(58) Field of Classification Search ....... 375/240.16–18; 382/248, 232
See application file for complete search history.

*Primary Examiner* — Jay Au Patel
*Assistant Examiner* — Geepy Pe
(74) *Attorney, Agent, or Firm* — Fish & Richardson P.C.

(57) ABSTRACT

Apparatus, systems and techniques based on an integer transform for encoding and decoding video or image signals, including transform of encoding and decoding of image and video signals and generation of an order-2N transform W from an order-N transform T in the field of image and video coding. For example, a retrieving unit is configured to retrieve an order-N transform T, where N is an integer; a deriving unit is configured to derive an order-2N transform W from the retrieved order-N transform T, and a transforming unit configured to generate an order-2N data Z using the derived transform W.

8 Claims, 2 Drawing Sheets

GENERATION OF AN ORDER-2N TRANSFORM FROM AN ORDER-N TRANSFORM

BACKGROUND

This application relates to digital image and video processing.

Various coding processes, such as standards MPEG-2, MPEG-4 Part 2, and H.263 standards, divide a picture into 16×16 non-overlapping blocks called macro blocks and then use a 2 dimensional (2D) order-8 discrete cosine transform (DCT) in digital video compression algorithms used in the coding standards. Such processing can be used to achieve low bit rate communications. Recently, new video coding standards, such as H.264/AVC, AVS and SMPTE 421M etc, have been proposed that use 2D (two dimensions) order-4 or order-8 integer cosine transforms to provide a better compressibility than the video standards based on the 2D order-8 DCT. In those standards, order-4 or order-8 integer transforms are used so as to seek a trade-off between computational efficiency and coding efficiency.

An order-N transform achieves data compression by exploiting the redundancy within N data elements. Generally, an order-2N transform exploits the redundancy within more data elements and so can achieve higher data compression than an order-N transform. Therefore, a system or method for generating an order-2N transform from an order-N transform in video or image coding is highly demanded.

SUMMARY

This application describes examples and implementations of apparatus, systems and techniques based on an integer transform for encoding and decoding video or image signals, including transform of encoding and decoding of image and video signals and generation of an order-2N transform W from an order-N transform T in the field of image and video coding.

In one aspect, a system of generation of an order-2N transform W from an order-N transform T includes:

a retrieving unit configured to retrieve the order-N transform T, where N is an integer; and a generating unit configured to generate the order-2N transform W from the retrieved order-N transform T by rules of $$w_{u,2i}=(1/\sqrt{2})t_{u,i} \text{ and } w_{u,2i+1}=(1/\sqrt{2})t_{u,i} \text{ for } i=0, 1, \ldots, N-1; \text{ and} \quad 1)$$

$$w_{2N-u-1,2i}=(1/\sqrt{2})t_{u,i} \text{ and } w_{2N-u-1,2i+1}=-(1/\sqrt{2})t_{u,i} \text{ for } i=0, 1, \ldots, N-1; \quad 2)$$

where $t_{u,i}$ is the (u, i)th element of the transform T; $w_{u,2i}$ and $w_{u,2i+1}$ are elements of the first N rows of the transform W; and $w_{2N-u-1,2i}$ and $w_{2N-u-1,2i+1}$ are elements of the last N rows of the transform W for u=0, 1, . . . , N−1.

Alternatively, an deriving unit may be configured to derive the order-2N transform W from the retrieved order-N transform T by rules of $$w_{u,2i}=(1/\sqrt{2})t_{u,i} \text{ and } w_{u,2i+1}=(1/\sqrt{2})t_{u,i} \text{ for } i=0, 1, \ldots, N-1; \text{ and} \quad 1)$$

$$w_{u+8,j} = \frac{(-1)^{Int\left(\frac{j+1}{2}\right)}}{\sqrt{2}} t_{u+8,Int(j/2)} \quad 2)$$

-continued $$\text{for } j = 0, 1, \ldots, 2N-1$$

where $t_{u,i}$ is the (u, i)th element of the transform T;

$$Int\left(\frac{j+1}{2}\right)$$

represents the integral part of $$\frac{j+1}{2};$$

and $w_{u,2i}$ and $w_{u,2i+1}$ are elements of the first N rows of the transform W; and $w_{u+8,j}$ are elements of the last N rows of the transform W for u=0, 1, . . . , N−1.

In another aspect, a method of generating an order-2N transform W from an order-N transform T includes:

retrieving the order-N transform T, where N is an integer; and generating the order-2N transform W from the retrieved order-N transform T by a rule of $$w_{u,2i}=(1/\sqrt{2})t_{u,i} \text{ and } w_{u,2i+1}=(1/\sqrt{2})t_{u,i} \text{ for } i=0, 1, \ldots, N-1; \text{ and} \quad 1)$$

$$w_{2N-u-1,2i}=(1/\sqrt{2})t_{u,i} \text{ and } w_{2N-u-1,2i+1}=-(1/\sqrt{2})t_{u,i} \text{ for } i=0, 1, \ldots, N-1; \quad 2)$$

where $t_{u,i}$ is the (u, i)th element of the transform T; $w_{u,2i}$ and $w_{u,2i+1}$ are elements of the first N rows of the transform W; and $w_{2N-u-1,2i}$ and $w_{2N-u-1,2i+1}$ are elements of the last N rows of the transform W for u=0, 1, . . . , N−1.

Alternately, the step of deriving can be carried out by rule of $$w_{u,2i}=(1/\sqrt{2})t_{u,i} \text{ and } w_{u,2i+1}=(1/\sqrt{2})t_{u,i} \text{ for } i=0, 1, \ldots, N-1; \text{ and} \quad 1)$$

$$w_{u+8,j} = \frac{(-1)^{Int\left(\frac{j+1}{2}\right)}}{\sqrt{2}} t_{u+8,Int(j/2)} \quad 2)$$

$$\text{for } j = 0, 1, \ldots, 2N-1$$

where $t_{u,i}$ is the (u, i)th element of the transform T;

$$Int\left(\frac{j+1}{2}\right)$$

represents the integral part of $$\frac{j+1}{2};$$

and $w_{u,2i}$ and $w_{u,2i+1}$ are elements of the first N rows of the transform W; and $w_{u+8,j}$ are elements of the last N rows of the transform W for u=0, 1, . . . , N−1.

The order-2N transform W obtained based the present techniques can be used to achieve one or more of advantages. For example, if the transform T has a high energy-packing ability, the resultant transform W also has a high energy-packing ability. If the transform T is an orthogonal one, the resultant transform W is an orthogonal one, too. If the transform T is an integer transform, the resultant transform W is also an integer transform. The order-2N transform W can be computed using a fast algorithm based on a fast algorithm for the order-N transform T as well as N additions and N subtractions.

The details of the above and other aspects of the described apparatus, systems and techniques are set forth in the accompanying drawings, the description and claims below.

DETAILED DESCRIPTION

Figure 1:
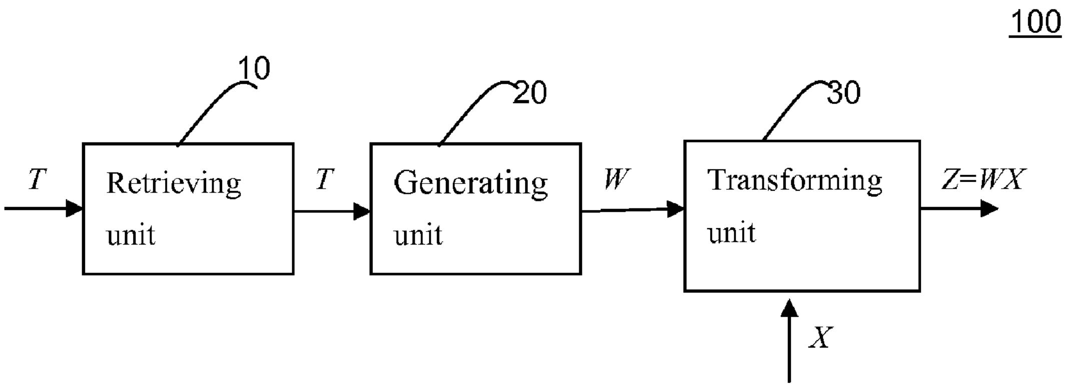
FIG. 1 is an example of a block diagram of a system of generation an order-2N integer transform from an order-N transform.

FIG. 1 shows an example of a system 100 of generation of an order-2N integer transform W. The system 100 includes a retrieving unit 10, a generating unit 20 and a transforming unit 30.

Let T be an order-N transform which can convert a data vector $X_N$ into a coefficient vector $C_N$. Let the i th element of the vector $X_N$ be $x_i$, the u th element of the vector $C_N$ be $c_u$, and the (u, i)th element of the transform T be $t_{u,i}$ where u and i=0, 1, . . . , N−1. The conversion from the data vector $X_N$ to the coefficient vector $C_N$ by the transform T is given by (1).

$$C_N = T\,X_N = \begin{bmatrix} t_{0,0} & t_{0,1} & \cdots & t_{0,N-1} \\ t_{1,0} & t_{1,1} & & t_{1,N-1} \\ \vdots & & \ddots & \vdots \\ t_{N-1,0} & t_{N-1,1} & \cdots & t_{N-1,N-1} \end{bmatrix} \begin{bmatrix} x_0 \\ x_1 \\ \vdots \\ x_{N-1} \end{bmatrix} \tag{1}$$

Let the u th row of the transform T be an row vector $T_{(u)}^T=(t_{u,0}\ t_{u,1}\ t_{u,2}\ \ldots\ t_{u,N-1})$ where u=0, 1, . . . , N−1, so the transform T could be shown in the form of below:

$$T = \begin{bmatrix} T_{(0)}^T \\ T_{(1)}^T \\ T_{(2)}^T \\ \vdots \\ T_{(N-1)}^T \end{bmatrix} \tag{2}$$

As is well known in the art, the u th row of a transform has u zero crossings. Hence, the number of zero crossings in the vector $T_{(u)}^T$ is u.

The retrieving unit 10 is utilized to retrieve the order-N transform T, which may be stored in a memory (not shown) in the system 100 or any storage means external to the system 100. The order-N transform is input into the retrieving unit 10 via a graphical user interfaces or the like.

The generating unit 20 receives the retrieved order-N transform T from the unit 10, and generates an order-2N transform W by computing the transform T, which will be detailed later.

The transforming unit 30 has two inputs, $W_{(u)}$ for u=0, 1, . . . , 2N−1 output from the generating unit 20 and a data matrix X to be transformed. The transforming unit 30 transforms the data matrix X into a data matrix Z by a rule of $$Z=WX \tag{3}$$

Then, the data matrix Z output from the transforming unit 30 is, for example, input into other processing unit, such as a quantization unit (not shown) used in an image or video coding system.

Hereafter, two examples are given to illustrate the generating unit 20 which generates the order-2N transform W by computing the transform T.

EXAMPLE 1

In this example, $W_A$ denotes the order-2N transform to be generated by the generating unit 20 from the order-N transform T. Let the u th row of the order-2N transform $W_A$ be a vector $W_{A(u)}^T=(w_{u,0}\ w_{u,1}\ w_{u,2}\ \ldots\ w_{u,2N-1})$ where u=0, 1, . . . , 2N−1, $$W_A = \begin{bmatrix} W_{A(0)}^T \\ W_{A(1)}^T \\ W_{A(2)}^T \\ \vdots \\ W_{A(2N-1)}^T \end{bmatrix}. \tag{4}$$

The generating unit 20 operates to generate the transform $W_A$ from the vector $T_{(u)}^T$ according to the following rules:

(1) the first N rows of the transform $W_A$ is obtained from the vector $T_{(u)}^T$ by a rule of $$w_{u,2i}=(1/\sqrt{2})t_{u,i} \text{ and } w_{u,2i+1}=(1/\sqrt{2})t_{u,i}, \text{ for } i=0, 1, \ldots, N-1 \tag{5}$$

and (2) the last N rows of the transform $W_A$ is obtained from $T_{(u)}^T$ by a rule of $$w_{2N-u-1,2i}=(1/\sqrt{2})t_{u,i} \text{ and } w_{2N-u-1,2i+1}=-(1/\sqrt{2})t_{u,i} \text{ for } i=0, 1, \ldots, N-1 \tag{6}$$

where $t_{u,i}$ is the (i)th element of the vector $T_{(u)}^T$ for u=0, 1, . . . , N−1.

The u th row of the transform $W_A$ has u zero crossings as mentioned above. Hence, the number of zero crossings in the vector $W_{A(u)}^T$ is u.

Let N=8. 16 elements of the first and last N rows of the transform $W_A$ are generated from 8 elements of the vector $T_{(u)}^T$ by rules of equations (5) and (6) as given in tables 1 and 2, respectively.

TABLE 1

Generation of the first 8 rows of $W_A$ from $t_{u,i}$ where u = 0, 1, . . . , 7.

| | i | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $t_{u,i}$ | $t_{u,0}$ | $t_{u,1}$ | $t_{u,2}$ | $t_{u,3}$ | $t_{u,4}$ | $t_{u,5}$ | $t_{u,6}$ | $t_{u,7}$ | | | | | | | | |
| $\sqrt{2}\,w_{u,i}$ | $t_{u,0}$ | $t_{u,0}$ | $t_{u,1}$ | $t_{u,1}$ | $t_{u,2}$ | $t_{u,2}$ | $t_{u,3}$ | $t_{u,3}$ | $t_{u,4}$ | $t_{u,4}$ | $t_{u,5}$ | $t_{u,5}$ | $t_{u,6}$ | $t_{u,6}$ | $t_{u,7}$ | $t_{u,7}$ |

TABLE 2

Generation of the last 8 rows of $W_A$ from $t_{u,i}$ where u = 0, 1, . . . , 7.

| | i | | | | | | | |
|---|---|---|---|---|---|---|---|---|
| | 0 | 1 | 2 | 3 | 4 | 5 | 6 | 7 |
| $t_{u,i}$ | $t_{u,0}$ | $t_{u,1}$ | $t_{u,2}$ | $t_{u,3}$ | $t_{u,4}$ | $t_{u,5}$ | $t_{u,6}$ | $t_{u,7}$ |
| $\sqrt{2}\, w_{15-u,i}$ | $t_{15-u,0}$ | $-t_{15-u,0}$ | $t_{15-u,1}$ | $-t_{15-u,1}$ | $t_{15-u,2}$ | $-t_{15-u,2}$ | $t_{15-u,3}$ | $-t_{15-u,3}$ |
| | i | | | | | | | |
| | 8 | 9 | 10 | 11 | 12 | 13 | 14 | 15 |
| $\sqrt{2}\, w_{15-u,i}$ | $t_{15-u,4}$ | $t_{15-u,4}$ | $t_{15-u,5}$ | $-t_{15-u,5}$ | $t_{15-u,6}$ | $-t_{15-u,6}$ | $t_{15-u,7}$ | $-t_{15-u,7}$ |

It can be seen from the above that both the first N rows and the last N rows of $W_A$ are generated from $T_{(u)}^T$. For N=8, the relation between u and 2N−u−1 (i.e. 15−u) is given in table 3.

TABLE 3

| | u | | | | | | | |
|---|---|---|---|---|---|---|---|---|
| | 0 | 1 | 2 | 3 | 4 | 5 | 6 | 7 |
| 15 − u | 15 | 14 | 13 | 12 | 11 | 10 | 9 | 8 |

Specifically, if the transform T is the order-8 transform adopted by Standard H.264 and u=1, i.e. $T_{(u)}^T=T_{(1)}^T=k_1$ [12 10 6 3 −3 −6 −10 −12] where $k_1$ is a constant such that the magnitude of $T_{(1)}$ equals unity, then the second row vector $W_{A(1)}^T$ of the transform $W_A$ is generated from $T_{(1)}^T$ as $W_{A(1)}^T=(k_1/\sqrt{2})$ [12 12 10 10 6 6 3 3 −3 −3 −6 −6 −10 −10 −12 −12]. And the fifteenth row vector $W_{A(14)}^T$ of the transform $W_A$ is generated from $T_{(1)}^T$ as $W_{A(14)}^T=(k_1/\sqrt{2})$ [12 −12 10 −10 6 −6 3 −3 −3 3 −6 6 −10 10 −12 12].

EXAMPLE 2

In this example, $W_B$ denotes the order-2N transform to be generated by the generating unit 20 from the order-N transform T. Let the u th row of the transform $W_B$ be a vector $W_{B(u)}^T=(w_{u,0}\, w_{u,1}\, w_{u,2} \ldots w_{u,2N-1})$, where u=0, 1, . . . , 2N−1, $$W_B = \begin{bmatrix} W_{B(0)}^T \\ W_{B(1)}^T \\ W_{B(2)}^T \\ \vdots \\ W_{B(2N-1)}^T \end{bmatrix}. \tag{7}$$

The generating unit 20 operates to generate the transform $W_B$ from the vector $T_{(u)}^T$ according to the following rules:

(1) the first N rows of the transform $W_B$ is obtained from the vector $T_{(u)}^T$ by a rule of $$w_{u,2i}=(1/\sqrt{2})t_{u,i} \text{ and } w_{u,2i+1}=(1/\sqrt{2})t_{u,i} \tag{7}$$

where i=0, 1, . . . , N−1, and u=0, 1, . . . , N−1; and (2) the last N rows of the transform $W_B$ is obtained from the vector $T_{(u)}^T$ by a rule of:

$$w_{u+8,j} = \frac{(-1)^{Int\left(\frac{j+1}{2}\right)}}{\sqrt{2}} t_{u+8,Int(j/2)} \tag{8}$$

for $j = 0, 1, \ldots, 2N-1$ where $$\mathrm{Int}\left(\frac{j+1}{2}\right)$$

represents the integral part of $$\frac{j+1}{2},$$

and $t_{u,i}$ is the (u,i)th element of the transform T for u=0, 1, . . . , N−1.

Let N=8. 16 elements of the first and last N rows of the transform $W_B$ are generated from 8 elements of the vector $T_{(u)}^T$ by rules of equations (7) and (8) as given in tables 4 and 5, respectively.

TABLE 4

Generation of the first 8 rows of $W_B$ from $t_{u,i}$ where u = 0, 1, . . . , 7.

| | i | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $t_{u,i}$ | $t_{u,0}$ | $t_{u,1}$ | $t_{u,2}$ | $t_{u,3}$ | $t_{u,4}$ | $t_{u,5}$ | $t_{u,6}$ | $t_{u,7}$ | | | | | | | | |
| $\sqrt{2}\, w_{u,i}$ | $t_{u,0}$ | $t_{u,0}$ | $t_{u,1}$ | $t_{u,1}$ | $t_{u,2}$ | $t_{u,2}$ | $t_{u,3}$ | $t_{u,3}$ | $t_{u,4}$ | $t_{u,4}$ | $t_{u,5}$ | $t_{u,5}$ | $t_{u,6}$ | $t_{u,6}$ | $t_{u,7}$ | $t_{u,7}$ |

TABLE 5

| Generation of the last 8 rows of $W_A$ from $t_{u,j}$ where u = 0, 1, . . . , 7. | | | | | | | | |
|---|---|---|---|---|---|---|---|---|
| j | 0 | 1 | 2 | 3 | 4 | 5 | 6 | 7 |
| $\mathrm{Int}\left(\frac{j+1}{2}\right)$ | 0 | 1 | 1 | 2 | 2 | 3 | 3 | 4 |
| $\sqrt{2}\, w_{u+8,j}$ | $t_{u,0}$ | $-t_{u,0}$ | $-t_{u,1}$ | $t_{u,1}$ | $t_{u,2}$ | $-t_{u,2}$ | $-t_{u,3}$ | $t_{u,3}$ |
| j | 8 | 9 | 10 | 11 | 12 | 13 | 14 | 15 |
| $\mathrm{Int}\left(\frac{j+1}{2}\right)$ | 4 | 5 | 5 | 6 | 6 | 7 | 7 | 8 |
| $\sqrt{2}\, w_{u+8,j}$ | $t_{u,4}$ | $-t_{u,4}$ | $-t_{u,5}$ | $t_{u,6}$ | $t_{u,6}$ | $-t_{u,6}$ | $-t_{u,7}$ | $t_{u,7}$ |

It can be seen from the above that both the first N rows and the last N rows of the transform $W_B$ are generated from ${T_{(u)}}^T$. For N=8, the relation between u and u+8 is given in table 6.

TABLE 6

| | u | | | | | | | |
|---|---|---|---|---|---|---|---|---|
| | 0 | 1 | 2 | 3 | 4 | 5 | 6 | 7 |
| u + 8 | 8 | 9 | 10 | 11 | 12 | 13 | 14 | 15 |

Specifically, if the transform T is the order-8 transform adopted by Standard H.264 and u=1, i.e. ${T_{(u)}}^T={T_{(1)}}^T=k_1$ [12 10 6 3 −3 −6 −10 −12] where $k_1$ is a constant such that the magnitude of $T_{(1)}$ equals unity, then the second row vector ${W_{B(1)}}^T$ of the transform $W_B$ is generated from ${T_{(1)}}^T$ as ${W_{B(1)}}^T=(k_1/\sqrt{2})$ [12 12 10 10 6 6 3 3 −3 −3 −6 −6 −10 −10 −12 −12] and the tenth row vector ${W_{B(9)}}^T$ of the transform $W_B$ is generated from ${T_{(1)}}^T$ as ${W_{B(9)}}^T=(k_1/\sqrt{2})$ [12 −12 −10 10 6 −6 −3 3 −3 3 6 −6 −10 10 12 −12].

Though the above two examples are given by using the order-8 transform provided by Standard H.264. It will be appreciated that various order-N transforms provided by coding schemes such as standards AVS, SMPTE 421M may be used in implementations. For example, the number of N is not limited to 8.

It is desirable to have a lesser computational requirement for a transform. The order-2N transform W can be computed using a fast algorithm based on:

(a) a fast algorithm for the order-N transform T; and (b) N addition and N subtraction operations.

Again, the fast algorithm, which can be applied to the order-2N transform W, will be exemplarily described in referring to the transform $W_A$ and $W_B$ as follows.

A Fast Algorithm for the Order-2N Transform $W_A$.

Let $X_u$ be a vector containing input data $x_0$ to $x_{2N-1}$, $Z_u$ be a transformed vector containing data $z_0$ to $z_{2N-1}$ from $X_u$ by a rule of $Z_u=W_AX_u$, i.e.

$$Z_u = \begin{bmatrix} z_0 \\ z_1 \\ z_2 \\ z_3 \\ z_4 \\ z_5 \\ \vdots \\ \vdots \\ \vdots \\ \vdots \\ \vdots \\ z_{2N-5} \\ z_{2N-4} \\ z_{2N-3} \\ z_{2N-2} \\ z_{2N-1} \end{bmatrix} = W_A X = \begin{bmatrix} W_{A(0)}^T \\ W_{A(1)}^T \\ W_{A(2)}^T \\ \vdots \\ W_{A(2N-1)}^T \end{bmatrix} \begin{bmatrix} x_0 \\ x_1 \\ x_2 \\ x_3 \\ x_4 \\ x_5 \\ \vdots \\ \vdots \\ \vdots \\ \vdots \\ \vdots \\ x_{2N-5} \\ x_{2N-4} \\ x_{2N-3} \\ x_{2N-2} \\ x_{2N-1} \end{bmatrix}. \tag{9}$$

Then, $Z_u$ can be divided into two parts $Z_1$ and $Z_2$ as follows.

$$Z_1 = \begin{bmatrix} z_0 \\ z_1 \\ z_2 \\ z_3 \\ \vdots \\ z_{N-2} \\ z_{N-1} \end{bmatrix} = \begin{bmatrix} T_{(0)}^T \\ T_{(1)}^T \\ T_{(2)}^T \\ \vdots \\ T_{(N-1)}^T \end{bmatrix} \begin{bmatrix} x_0 + x_1 \\ x_2 + x_3 \\ x_4 + x_5 \\ \vdots \\ \vdots \\ x_{2N-4} + x_{2N-3} \\ x_{2N-2} + x_{2N-1} \end{bmatrix} = T \begin{bmatrix} x_0 + x_1 \\ x_2 + x_3 \\ x_4 + x_5 \\ \vdots \\ \vdots \\ x_{2N-4} + x_{2N-3} \\ x_{2N-2} + x_{2N-1} \end{bmatrix}. \tag{10}$$

$$Z_2 = \begin{bmatrix} Z_{2N-1} \\ Z_{2N-2} \\ Z_{2N-3} \\ Z_{2N-4} \\ \vdots \\ Z_{N+1} \\ Z_N \end{bmatrix} = \begin{bmatrix} T_{(0)}^T \\ T_{(1)}^T \\ T_{(2)}^T \\ \vdots \\ T_{(N-1)}^T \end{bmatrix} \begin{bmatrix} x_0 - x_1 \\ x_2 - x_3 \\ x_4 - x_5 \\ \vdots \\ \vdots \\ x_{2N-4} - x_{2N-3} \\ x_{2N-2} - x_{2N-1} \end{bmatrix} = T \begin{bmatrix} x_0 - x_1 \\ x_2 - x_3 \\ x_4 - x_5 \\ \vdots \\ \vdots \\ x_{2N-4} - x_{2N-3} \\ x_{2N-2} - x_{2N-1} \end{bmatrix}. \tag{11}$$

Hence, the fast algorithm for $W_A$ requires a) N additions and a fast algorithm for the order-N transform T as given in (10) and b) N subtractions and a fast algorithm for the order-N transform T as given in (11).

An Fast Algorithm for the Order-2N Transform $W_B$

Again, let $X_u$ be a vector containing input data $x_0$ to $x_{2N-1}$, $Z_u$ be a transformed vector containing data $z_0$ to $z_{2N-1}$ from $X_u$ by a rule of $Z_u=W_BX_u$, i.e.

$$Z_u = \begin{bmatrix} z_0 \\ z_1 \\ z_2 \\ z_3 \\ z_4 \\ z_5 \\ \vdots \\ \vdots \\ \vdots \\ \vdots \\ \vdots \\ z_{2N-5} \\ z_{2N-4} \\ z_{2N-3} \\ z_{2N-2} \\ z_{2N-1} \end{bmatrix} = W_B X = \begin{bmatrix} W_{B(0)}^T \\ W_{B(1)}^T \\ W_{B(2)}^T \\ \vdots \\ W_{B(2N-1)}^T \end{bmatrix} \begin{bmatrix} x_0 \\ x_1 \\ x_2 \\ x_3 \\ x_4 \\ x_5 \\ \vdots \\ \vdots \\ \vdots \\ \vdots \\ \vdots \\ x_{2N-5} \\ x_{2N-4} \\ x_{2N-3} \\ x_{2N-2} \\ x_{2N-1} \end{bmatrix}. \tag{12}$$

Then, $Z_u$ can be divided into two parts $Z'_1$ and $Z'_2$ as follows.

$$Z'_1 = \begin{bmatrix} z_0 \\ z_1 \\ z_2 \\ z_3 \\ \vdots \\ z_{N-2} \\ z_{N-1} \end{bmatrix} = \begin{bmatrix} T_{(0)}^T \\ T_{(1)}^T \\ T_{(2)}^T \\ \vdots \\ T_{(N-1)}^T \end{bmatrix} \begin{bmatrix} x_0 + x_1 \\ x_2 + x_3 \\ x_4 + x_5 \\ \vdots \\ \vdots \\ x_{2N-4} + x_{2N-3} \\ x_{2N-2} + x_{2N-1} \end{bmatrix} = T \begin{bmatrix} x_0 + x_1 \\ x_2 + x_3 \\ x_4 + x_5 \\ \vdots \\ \vdots \\ x_{2N-4} + x_{2N-3} \\ x_{2N-2} + x_{2N-1} \end{bmatrix}. \tag{13}$$

$$Z'_2 = \begin{bmatrix} z_N \\ z_{N+1} \\ z_{N+2} \\ z_{N+3} \\ \vdots \\ z_{2N-2} \\ z_{2N-1} \end{bmatrix} = \begin{bmatrix} T_{(0)}^T \\ T_{(1)}^T \\ T_{(2)}^T \\ \vdots \\ T_{(N-1)}^T \end{bmatrix} \begin{bmatrix} x_0 - x_1 \\ x_3 - x_2 \\ x_4 - x_5 \\ x_7 - x_6 \\ \vdots \\ x_{2N-4} - x_{2N-3} \\ x_{2N-1} - x_{2N-2} \end{bmatrix} = T \begin{bmatrix} x_0 - x_1 \\ x_3 - x_2 \\ x_4 - x_5 \\ x_7 - x_6 \\ \vdots \\ x_{2N-4} - x_{2N-3} \\ x_{2N-1} - x_{2N-2} \end{bmatrix}. \tag{14}$$

Similar to the fast algorithm for $W_A$, the fast algorithm for $W_B$ requires a) N additions and a fast algorithm for the order-N transform T as given in (13) and b) N subtractions and a fast algorithm for the order-N transform T as given in (14).

While the retrieving unit 10, the generating unit 20 and the transforming unit 30 are shown in FIG. 1 and described herein as three separate units, other implementations are possible. For example, the units 10, 20 and 30 may be integrated into one chip or arranged into multiple units separately, and may be implemented either by software or hardware, or the combination of software and hardware.

Figure 2:
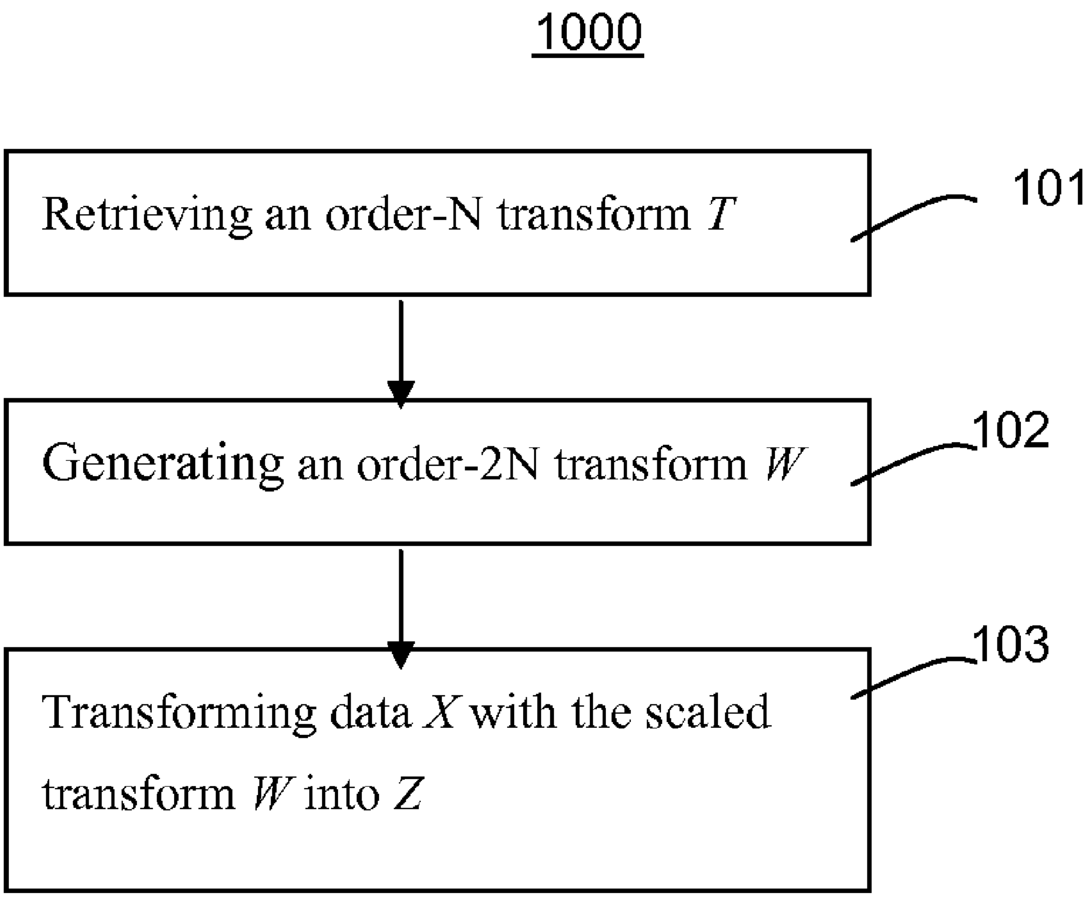
FIG. 2 illustrates exemplarily a method of generating an order-2N integer transform.

FIG. 2 illustrates an example of a process 100 of generating an order-2N integer transform from an order-N transform.

The process 1000 begins at step 101, where an order-N transform T is retrieved. At step 102, the order-2N transform W is generated by computing the transform T by rules set forth in equations (5)-(6), or equations (7)-(8).

Then, the process 1000 proceeds to step 103, where, the data X to be transformed are received and transformed by a rule of Z=WX.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of what is disclosed here, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

A computer system for implementing the disclosed embodiments can include client computers (clients) and server computers (servers). A client and a server are generally remote from each other and typically interact through a communication network. The relationship of client and server can arise by virtue of computer programs running on the respective computers and having a client-server relationship to each other.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, operations are depicted in the drawings in a particular order, and such operations should be performed in the particular order shown or in sequential order, and that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

The invention claimed is:

1. A system comprising:

memory configured to store an order-N transform T; and one or more hardware processors communicatively coupled with the memory, the one or more hardware processors configured to receive a video signal, execute a retrieving unit configured to retrieve from the memory the order-N transform T, where N is an integer, execute a generating unit configured to generate the order-2N transform W from the retrieved order-N transform T by rules of $$w_{u,2i}=(1/\sqrt{2})t_{u,i} \text{ and } w_{u,2i+1}=(1/\sqrt{2})t_{u,i} \text{ for } i=0, 1, \ldots, N-1; \text{ and} \quad 1)$$

$$w_{2N-u-1,2i}=(1/\sqrt{2})t_{u,i} \text{ and } w_{2N-u-1,2i+1}=-(1/\sqrt{2})t_{u,i} \text{ for } i=0, 1, \ldots, N-1; \quad 2)$$

where $t_{u,i}$ is the (u, i)th element of the transform T, $w_{u,2i}$ and $w_{u,2i+1}$ are elements of the first N rows of the transform W, and $w_{2N-u-1,2i}$ and $w_{2N-u-1,2i+1}$ are elements of the last N rows of the transform W for u=0, 1, . . . , N−1, process the received video signal using the generated order-2N transform W, and output the processed video signal.

2. The system according to claim 1, where the one or more hardware processors are further configured to execute a transforming unit configured to receive a data vector X associated with the received video signal, the data vector X containing elements $x_0, x_1, \ldots, x_{2N-1}$ to be transformed, and transform the received data vector X into a data vector Z containing elements $z_0, z_1, \ldots, z_{2N-1}$ with the generated W by a rule of Z=WX.

3. The system according to claim 2, wherein the transforming unit transforms the received data vector X into the data vector Z by the following equations:

$$\begin{bmatrix} z_0 \\ z_1 \\ z_2 \\ z_3 \\ \vdots \\ z_{N-2} \\ z_{N-1} \end{bmatrix} = \begin{bmatrix} T_{(0)}^T \\ T_{(1)}^T \\ T_{(2)}^T \\ \vdots \\ T_{(N-1)}^T \end{bmatrix} \begin{bmatrix} x_0 + x_1 \\ x_2 + x_3 \\ x_4 + x_5 \\ \vdots \\ \vdots \\ x_{2N-4} + x_{2N-3} \\ x_{2N-2} + x_{2N-1} \end{bmatrix} = T \begin{bmatrix} x_0 + x_1 \\ x_2 + x_3 \\ x_4 + x_5 \\ \vdots \\ \vdots \\ x_{2N-4} + x_{2N-3} \\ x_{2N-2} + x_{2N-1} \end{bmatrix};$$

$$\begin{bmatrix} Z_{2N-1} \\ Z_{2N-2} \\ Z_{2N-3} \\ Z_{2N-4} \\ \vdots \\ Z_{N+1} \\ Z_N \end{bmatrix} = \begin{bmatrix} T_{(0)}^T \\ T_{(1)}^T \\ T_{(2)}^T \\ \vdots \\ T_{(N-1)}^T \end{bmatrix} \begin{bmatrix} x_0 - x_1 \\ x_2 - x_3 \\ x_4 - x_5 \\ \vdots \\ \vdots \\ x_{2N-4} - x_{2N-3} \\ x_{2N-2} - x_{2N-1} \end{bmatrix} = T \begin{bmatrix} x_0 - x_1 \\ x_2 - x_3 \\ x_4 - x_5 \\ \vdots \\ \vdots \\ x_{2N-4} - x_{2N-3} \\ x_{2N-2} - x_{2N-1} \end{bmatrix}.$$

4. The system according to claim 1, wherein the order-N transform T is an integer cosine transform used in any of existing video coding standards H.264, AVS and SMPTE 421M for encoding or decoding the received video signal.

5. A method comprising:

receiving, at a hardware processor, a video signal;

retrieving, by the hardware processor from memory, an order-N transform T, where N is an integer; and generating, by the hardware processor, an order-2N transform W from the retrieved order-N transform T by a rule of $$w_{u,2i}=(1/\sqrt{2})t_{u,i} \text{ and } w_{u,2i+1}=(1/\sqrt{2})t_{u,i} \text{ for } i=0, 1, \ldots, N-1; \text{ and} \quad 1)$$

$$w_{2N-u-1,2i}=(1/\sqrt{2})t_{u,i} \text{ and } w_{2N-u-1,2i+1}=-(1/\sqrt{2})t_{u,i} \text{ for } i=0, 1, \ldots, N-1; \quad 2)$$

where $t_{u,i}$ is the (u, i)th element of the transform T; $w_{u,2i}$ and $w_{u,2i+1}$ elements of the first N rows of the transform W; $w_{2N-u-1,2i}$ and $w_{2N-u-1,2i+1}$ are elements of the last N rows of the transform W;

processing, by the hardware processor, the received video signal using the generated order-2N transform W; and outputting, by the hardware processor, the processed video signal.

6. The method according to claim 5, further comprising: receiving a data vector X associated with the video signal, the data vector X containing elements $x_0, x_1, \ldots, x_{2N-1}$ to be transformed; and transforming the received data vector X into a data vector Z containing elements $z_0, z_1, \ldots, z_{2N-1}$ with the generated W by a rule of Z=WX.

7. The method according to claim 6, wherein the transforming is carried out by the following equations:

$$\begin{bmatrix} z_0 \\ z_1 \\ z_2 \\ z_3 \\ \vdots \\ z_{N-2} \\ z_{N-1} \end{bmatrix} = \begin{bmatrix} T_{(0)}^T \\ T_{(1)}^T \\ T_{(2)}^T \\ \vdots \\ T_{(N-1)}^T \end{bmatrix} \begin{bmatrix} x_0 + x_1 \\ x_2 + x_3 \\ x_4 + x_5 \\ \vdots \\ \vdots \\ x_{2N-4} + x_{2N-3} \\ x_{2N-2} + x_{2N-1} \end{bmatrix} = T \begin{bmatrix} x_0 + x_1 \\ x_2 + x_3 \\ x_4 + x_5 \\ \vdots \\ \vdots \\ x_{2N-4} + x_{2N-3} \\ x_{2N-2} + x_{2N-1} \end{bmatrix};$$

-continued $$\begin{bmatrix} z_N \\ z_{N+1} \\ z_{N+2} \\ z_{N+3} \\ \vdots \\ z_{2N-2} \\ z_{2N-1} \end{bmatrix} = \begin{bmatrix} T_{(0)}^T \\ T_{(1)}^T \\ T_{(2)}^T \\ \vdots \\ T_{(N-1)}^T \end{bmatrix} \begin{bmatrix} x_0 - x_1 \\ x_3 - x_2 \\ x_4 - x_5 \\ x_7 - x_6 \\ \vdots \\ x_{2N-4} - x_{2N-3} \\ x_{2N-1} - x_{2N-2} \end{bmatrix} = T \begin{bmatrix} x_0 - x_1 \\ x_3 - x_2 \\ x_4 - x_5 \\ x_7 - x_6 \\ \vdots \\ x_{2N-4} - x_{2N-3} \\ x_{2N-1} - x_{2N-2} \end{bmatrix}.$$

8. The method according to claim 5, wherein the order-N transform T is an integer cosine transform used in any of existing video coding standards H.264, AVS and SMPTE 421M for encoding or decoding the received video signal.

* * * * *

UNITED STATES PATENT AND TRADEMARK OFFICE

CERTIFICATE OF CORRECTION

PATENT NO. : 8,102,918 B2

APPLICATION NO. : 12/103678

DATED : January 24, 2012

INVENTOR(S) : Wai Kuen Cham

It is certified that error appears in the above-identified patent and that said Letters Patent is hereby corrected as shown below:

Column 12, line 63, delete “elements” and insert -- are elements -- therefor.

Column 12, line 63, after “W;”, insert -- and --.

Column 14, lines 3-10, delete the table as shown and insert therefor:

--
$$\begin{bmatrix} Z_{2N-1} \\ Z_{2N-2} \\ Z_{2N-3} \\ Z_{2N-4} \\ \vdots \\ Z_{N+1} \\ Z_N \end{bmatrix} = \begin{bmatrix} T_{(0)}^T \\ T_{(1)}^T \\ T_{(2)}^T \\ \vdots \\ T_{(N-1)}^T \end{bmatrix} \begin{bmatrix} x_0 - x_1 \\ x_2 - x_3 \\ x_4 - x_5 \\ \vdots \\ \vdots \\ x_{2N-4} - x_{2N-3} \\ x_{2N-2} - x_{2N-1} \end{bmatrix} = T \begin{bmatrix} x_0 - x_1 \\ x_2 - x_3 \\ x_4 - x_5 \\ \vdots \\ \vdots \\ x_{2N-4} - x_{2N-3} \\ x_{2N-2} - x_{2N-1} \end{bmatrix}.$$
--.

Signed and Sealed this
Eighth Day of May, 2012

David J. Kappos
*Director of the United States Patent and Trademark Office*